US012650003B2

(12) United States Patent
Ma et al.

(10) Patent No.: US 12,650,003 B2
(45) Date of Patent: Jun. 9, 2026

(54) HYDRAULIC MACHINE SWING SYSTEM WITH ANTI-DRIFT

(71) Applicant: Caterpillar Inc., Peoria, IL (US)

(72) Inventors: Pengfei Ma, Naperville, IL (US); Brett James Janson, Hanna City, IL (US); Jordan Garrity, Tucson, AZ (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/783,262

(22) Filed: Jul. 24, 2024

(65) Prior Publication Data

US 2026/0028797 A1 Jan. 29, 2026

(51) Int. Cl.
*E02F 9/12* (2006.01)
*F15B 13/04* (2006.01)
*F15B 13/044* (2006.01)

(52) U.S. Cl.
CPC .......... *E02F 9/123* (2013.01); *F15B 13/0401* (2013.01); *F15B 13/044* (2013.01); *F15B 2211/30515* (2013.01); *F15B 2211/50527* (2013.01); *F15B 2211/6336* (2013.01); *F15B 2211/7058* (2013.01)

(58) Field of Classification Search
CPC .. F15B 2211/30515; F15B 2211/50527; F15B 2211/6336; F15B 2211/7058
USPC .......................................................... 60/468
See application file for complete search history.

(56) References Cited

U.S. PATENT DOCUMENTS

| | | | | |
|---|---|---|---|---|
| 4,425,759 | A * | 1/1984 | Krusche | E02F 9/2225 60/420 |
| 4,464,898 | A | 8/1984 | Aoyagi et al. | |
| 5,005,358 | A * | 4/1991 | Hirata | F15B 13/0417 60/426 |
| 8,776,512 | B2 | 7/2014 | Lastre | |
| 9,057,173 | B2 | 6/2015 | Hiroki | |
| 9,739,372 | B2 * | 8/2017 | Neumann | F16H 61/20 |
| 10,024,341 | B2 | 7/2018 | Zhang | |
| 10,745,254 | B2 * | 8/2020 | Miyazaki | B66C 23/86 |
| 2008/0250781 | A1 * | 10/2008 | Mueller | F15B 1/024 60/414 |
| 2013/0081384 | A1 * | 4/2013 | Opdenbosch | E02F 9/2296 60/494 |

(Continued)

FOREIGN PATENT DOCUMENTS

| | | | |
|---|---|---|---|
| EP | 3470584 | A1 | 4/2019 |
| KR | 19990025124 | A | 4/1999 |

OTHER PUBLICATIONS

Written Opinion and International Search Report for Int'l. Patent Appln. No. PCT/US2025/035325, mailed Oct. 28, 2025 (13 pgs).

*Primary Examiner* — Thomas E Lazo

(57) ABSTRACT

A system and method for a hydraulic swing system of a machine to prevent drift without engaging a swing brake is described. The hydraulic swing system includes a pump powered by a motive element such as an engine and provides a swing motor for rotating the chassis of the machine relative to the undercarriage. The swing system includes a control valve on a first path between the pump and the motor and a second control valve on a second path. The swing system further includes a blocking valve to blocking hydraulic fluid flow and thereby preventing drift engaged when the system is in neutral and below a threshold rotation rate.

18 Claims, 5 Drawing Sheets

(56) References Cited

U.S. PATENT DOCUMENTS

| | | | | |
|---|---|---|---|---|
| 2013/0098020 | A1* | 4/2013 | Opdenbosch | F15B 7/006<br>60/428 |
| 2013/0098459 | A1* | 4/2013 | Opdenbosch | E02F 9/2217<br>137/563 |
| 2015/0292181 | A1* | 10/2015 | Graf | E02F 9/123<br>60/468 |
| 2016/0312443 | A1 | 10/2016 | Egawa | |
| 2019/0106306 | A1* | 4/2019 | Miyazaki | E02F 9/128 |
| 2022/0259828 | A1* | 8/2022 | Zhang | E02F 9/2242 |

* cited by examiner

HYDRAULIC MACHINE SWING SYSTEM WITH ANTI-DRIFT

TECHNICAL FIELD

The present application relates generally to hydraulic machinery, and more particularly to a hydraulic swing system for a vehicle or machine that includes an anti-drift system to prevent machine swing due to gravity or other loading.

BACKGROUND

Excavators and other machines often have hydraulically-controlled components. For example, a hydraulic pump linked to hydraulic cylinders can actuate a boom, stick, and/or bucket of an excavator. Conventionally, hydraulic components are often directly controlled mechanically. For example, in conventional mechanical control, movement of a lever can mechanically open or close a hydraulic valve to change the pressure in a hydraulic cylinder and thereby cause movement of a machine component. More recently, machines have been developed that use electrohydraulic controls instead of direct mechanical controls for hydraulic components. Electrohydraulic controls can translate input commands into electric currents or signals that drive actuation of hydraulic components.

Existing systems may provide for hydraulic swing systems and methods to overcome drift as a result of internal leakages of a closed loop hydraulic system. One such system is described in U.S. Pat. No. 8,776,512 to Lastre (hereinafter "the '512 patent"). The '512 patent provides for a swing system of a construction machine or vehicle and particularly for "a swing brake for blocking or unblocking a rotational movement of a first portion of the vehicle relative to a chassis portion of the vehicle." Abstract. The '512 patent describes controlling a swing brake of the machine that is automatically engaged when the swing pump is in a neutral position where no rotational movement is taking place in the swing system. Based on a sensor connected to the swing pump of the device, a neutral position of the swash plate is detected for determining the neutral position. When the swash plate is determined to be neutral, the swing brake is automatically applied to prevent drift of the machine.

Although the '512 patent describes an anti-drift system for the swing system of a construction machine, the '512 patent does not provide for preventing the internal leakages of the hydraulic system and instead relies on an entirely separate braking system to prevent drift. The '512 patent therefore still allows the swing system to drift if the swing brake is not applied, and also does not provide for preventing drift when the machine is rotating at a low rotation rate but requires it to be completely stationary and also provides for additional wear and tear on the braking components, thereby decreasing the lifespan of the braking components before they must be serviced, thereby taking the machine out of service.

Examples of the present disclosure are directed toward overcoming the deficiencies described above.

SUMMARY OF THE INVENTION

In some examples, the systems and techniques described herein may provide a hydraulic swing system for a hydraulic machine. The hydraulic swing system includes a hydraulic pump driven by a motive device and a hydraulic motor configured to drive rotation of the hydraulic swing system. The system also includes a first swing control valve assembly in a first hydraulic path between the hydraulic pump and the hydraulic motor. The first swing control valve assembly includes a first control valve for controlling hydraulic fluid flow to the hydraulic motor and a first blocking valve connected to the first control valve, having a first position and a second position driven by a solenoid and a return.

In some examples, the hydraulic swing system may include a second swing control valve assembly in a second hydraulic path between the hydraulic pump and the hydraulic motor. The second swing control valve assembly includes a second control valve for controlling hydraulic fluid flow to the hydraulic motor and a second blocking valve connected to the second control valve, having a first position and a second position driven by a solenoid and a return. In the first position, a conduit is opened between a fluid reservoir and the first hydraulic path, and in the second position, the conduit between the fluid reservoir and the first hydraulic path is blocked. The hydraulic swing system may include a controller configured to receive inputs from an operator of the hydraulic machine and control operation of the hydraulic pump and first control valve. The controller may be configured to activate the solenoid in response to a neutral indication from a user input. Activating the solenoid causes the first blocking valve to move to the second position. The solenoid is further configured to activate in response to a rotation rate of the hydraulic swing system being below a threshold rotation rate. Implementations of the described techniques may include hardware, a method or process, or computer software on a computer-accessible medium.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Wherever possible, the same reference numbers will be used throughout the drawings to refer to the same or like parts. In the figures, the left-most digit(s) of a reference number identifies the figure in which the reference number first appears.

Figure 1:
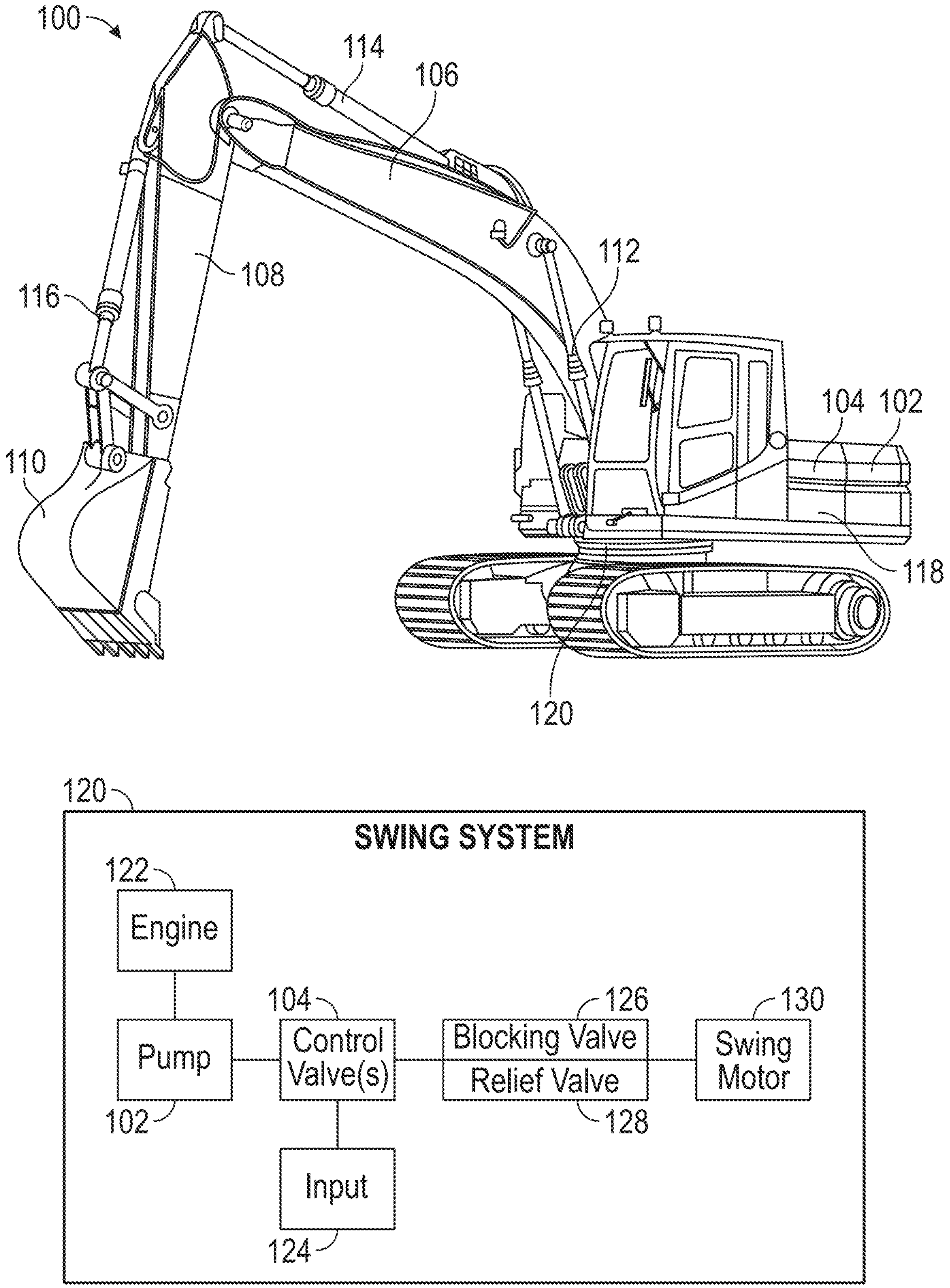
FIG. 1 depicts an example of a machine implementing a hydraulic swing system with an anti-drift mechanism, according to at least one example.

FIG. 1 depicts an example of a machine 100. A machine 100 can have a substantially rigid frame, and include a pump 102 and one or more control valve(s) 104 configured to control pressure of hydraulic fluid within the machine 100 that can actuate one or more hydraulically-controlled components of the machine 100. In the example of FIG. 1, the machine 100 is an excavator with hydraulically-controlled components including a boom 106, a stick 108, and a bucket 110. Though depicted and described herein with respect to the machine 100 as shown being an excavator, other machines such as construction machinery, excavation machinery, stationary equipment, or other such machinery may implement the swing system described herein. In particular, the swing system is designed to neutralize the effect of a torque induced on the swing system by a load by providing a blocking valve and relief system to counteract internal leakages of the closed loop swing system that result in machine drift.

The systems and methods herein provide for mitigation or elimination of the machine drift during operation of the machine 100. Such a drift may occur especially when the construction machinery or vehicle is positioned or moving on a slope and has a load attached. The present system reduces the swing drift of a construction machinery or vehicle, particularly of an excavator of crane, equipped with a closed loop swing system, by providing and applying a blocking valve when the upper portion of the machine should be standing still (i.e. when it should keep its position and orientation relative to the under-carriage on which it is mounted) as determined based on operator input. For example, when the operator is not providing an input, the upper portion of the machine 100 is enabled to remain stationary and thereby counteract machine drift typical in conventional machines. Further, the blocking valve and systems described herein can be easily added to a known swing system.

The system described herein provide the operator with higher comfort by preventing machine drift in the swing system when the upper portion is supposed to be standing still (e.g., not rotating relative to the undercarriage or chassis on which it is mounted), thus considerably reducing or even avoiding the risk of an unwanted drift movement due to internal leakages in the hydraulic system of the swing motor and swing pump. Additionally, as the swing drift is significantly reduced (or even avoided) without human intervention, the machine 100 is improved, in this case, by reducing (or avoiding) the swing drift.

The rotational movement of the machine 100, e.g., of the upper portion relative to the lower portion or undercarriage, is controlled by a manipulator operated by the operator. The controller of the machine 100, such as an electronic control module, computing device, or other control architecture or system, provides for controlling the blocking and anti-drift system described herein. The controller is enabled to receive sensor data from the manipulator as well as a rotational sensor of the machine 100 to provide sensor data that can be used for the controller to automatically implement the blocking valve without operator input. For instance, the manipulator may be determined to be in neutral and the rotation rate of the machine 100 (e.g., swing rate) may be below a threshold level to cause the controller to enable the blocking system of the hydraulic swing system.

In an example, the machine 100 is controlled by a controller capable of (i) identifying a neutral position of a swing input manipulator, (ii) identifying a swing rate below a threshold level, and (iii) activating an active component to implement a blocking valve that prevents the internal leakages of the hydraulic swing system from causing drift.

Returning to the machine, 100, the pump 102 and/or control valve(s) 104 can control hydraulic cylinders to actuate movement of one or more of the hydraulically-controlled components. For example, a hydraulic boom cylinder 112 can control movement of the boom 106, a hydraulic stick cylinder 114 can control movement of the stick 108, and a hydraulic bucket cylinder 116 can control movement of the bucket 110 and/or linkage. In other examples, the machine 100 can be any other type of machine with hydraulically-controlled components, such as a wheel loader with a hydraulically-controlled bucket, or a motor grader with a hydraulically-controlled drawbar, circle, and moldboard (DCM).

The machine 100 can be at least partially electrohydraulically controlled, such that an electric current applied to the control valve(s) 104 can cause the control valve(s) 104 to open or close by different degrees to different valve displacement positions, in turn causing corresponding movement of one or more hydraulically-controlled components. For example, the control valve(s) 104 can have a valve solenoid, and an electric current provided to the valve solenoid can be adjusted such that the control valve(s) 104 opens or closes to a valve displacement that results in a corresponding movement of a boom 106, stick 108, bucket 110, and/or other hydraulically-controlled component.

The machine 100 can have an electronic control module (ECM) 118 (e.g., a controller). The ECM can be a machine control system that can adjust an electric current, such as a valve solenoid current, provided to one or more control valve(s) 104. In some examples, the ECM 118 may include a processor and non-transitory computer-readable medium having instructions stored thereon that, when executed, causes the processor to perform operations, such as control of valves, valve solenoids, or other such controlling operations. The ECM 118 can process input data, including operator commands and/or data about the current state of the machine 100, and determine electric currents to be provided to one or more control valve(s) 104 that can cause movement of the hydraulically-controlled components.

In an example, the machine 100 may be controlled using an input device that is used to control a velocity of various components of the machine. In this manner, an input from the operator may cause motion with a velocity proportional to the input provided by the operator at the particular command. When the operator wishes to keep the machine stationary, the input device may be returned to a neutral position. The machine 100 will then maintain the present position as the velocity is set to zero in the neutral position.

For example, a human operator sitting in a cab of an excavator can move a lever in the cab, or use another type of control, to input an input command, such as a velocity command for a "stick-in" event to move the stick 108 inward at a velocity desired by the operator. As another example, software implementing an autonomous operator can directly output a velocity command or other input command without physical movement of a lever or other control. Velocity commands or other input commands may correspond to different types of functions, operations, or events, such as "stick-in" events, "stick-out" events, "boom-up" events, "boom-down" events, "bucket-curl" events, "bucket-dump" events, or any other event associated with movement of one or more hydraulically-controlled components.

Described herein are systems related to a swing system of the machine 100, though other hydraulic systems may use the systems and devices described herein. The swing system 120 provides for an upper portion or carriage of the machine 100 to move (e.g., rotate) relative to the base of the machine. The swing system 120 provides for swing movement as controlled by the operator via a control lever or other input device. This input device controls the rotational movement of the upper portion of the machine 100 relative to the base of the machine 100 undercarriage of the excavator. This rotational movement can be to the left-hand side or to the right-hand side direction.

The machine 100 implements a closed loop swing system wherein the swing system 120 is actuated by a swing motor 130, for instance a fixed displacement piston motor, which may include a swing brake system, for instance comprising a multi-discs brake which is applied via a brake cylinder and spring when no control pressure is present, and a pump 102 powered by an engine 122 or other motive device (e.g., electrical motor or other such rotational motion source), e.g. a variable displacement piston pump, the displacement of which is controlled by the control input. The hydraulic fluid is driven by the pump 102 to control valve(s) 104 for controlling hydraulic fluid flowing to the swing motor 130 and thereby controlling the rotation of the upper portion of the machine 100.

The swing system further includes a blocking valve 126 and a relief valve 128 or multiple relief valves. The blocking valve may provide for shutting off a conduit between the control valve(s) 104 and a pilot source of the hydraulic fluid. The maximum working pressure of the swing system 120 is limited by the relief valve 128. The swing system 120 may also include a charging pump (shown in FIG. 3) which is maintaining the pressure in the system to prevent cavitations. The relief valves 128 may be arranged in parallel to each other and connected to the right-hand side and the left-hand side of pump 102 and the swing motor 130.

The hydraulic pressure of the hydraulic components such as the charging pump, the pump 102, the swing motor 130, the relief valve 128, and other such components of the swing system 120 can be released into a common tank or into a multitude of tanks.

Figure 2:
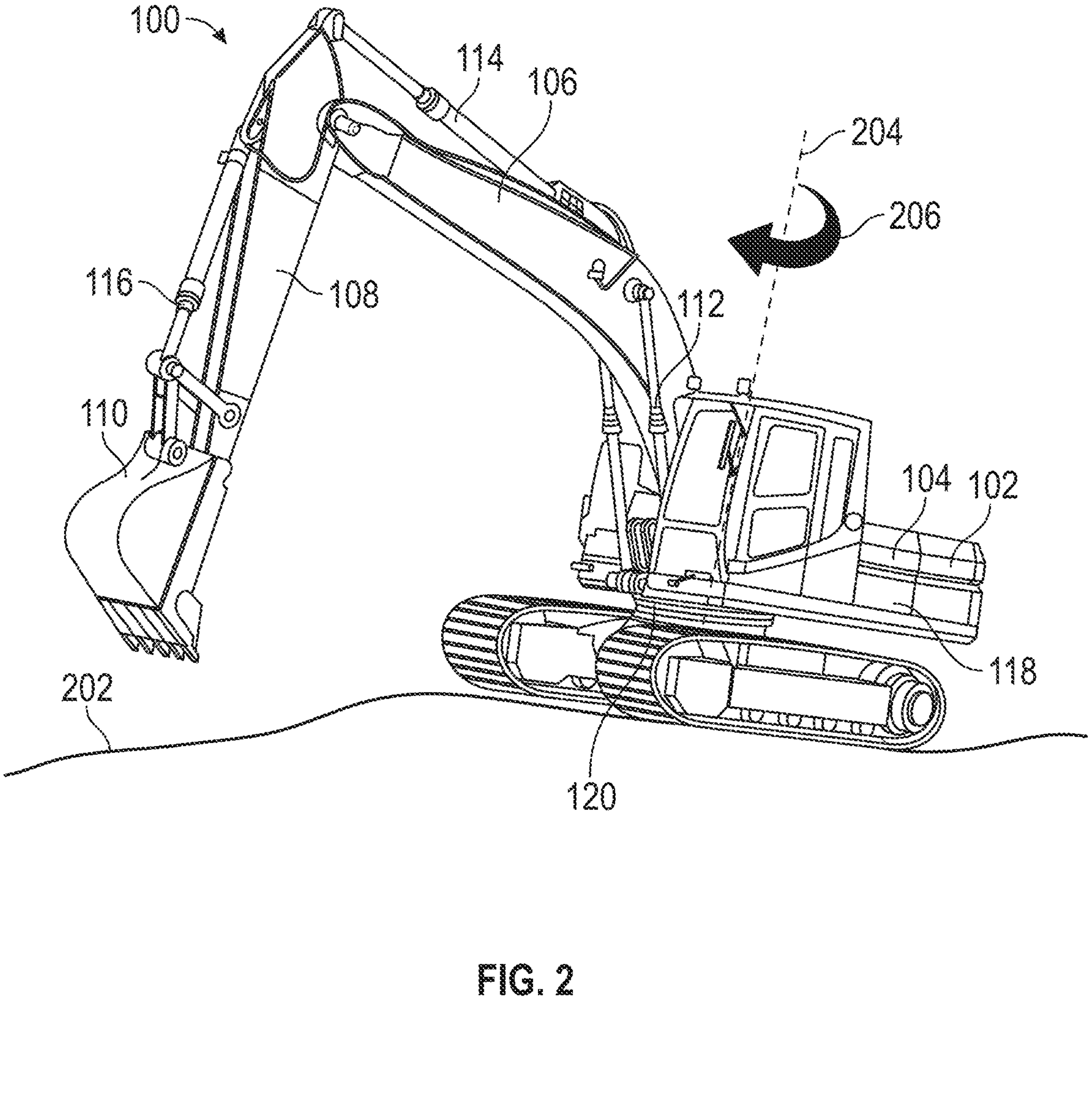
FIG. 2 depicts an example of the machine of FIG. 1 on a non-level surface experiencing gravity loading to result in force on the hydraulic swing system, according to at least one example.

During operation of the machine 100, the swing parking brake is not engaged, as the machine may need to rotate and engagement/disengagement of the swing parking brake may take time that causes delay in operation of the machine 100 and therefore delays production. As illustrated in FIG. 2, the machine 100 is often not positioned on a level surface. FIG. 2 depicts an example of the machine 100 of FIG. 1 on a non-level surface experiencing gravity loading to result in force on the hydraulic swing system, according to at least one example.

For instance, in FIG. 2, the machine 100 is resting on an incline 202 that causes the machine 100 to be non-level and therefore results in rotation 206 of the upper portion of the machine 100 about an axis 204 that is not perpendicular to a direction of gravity. Accordingly, as the machine 100 is rotated about the axis 204, the gravity load on the machine 100 (e.g., on the boom or other components) may cause leakage in the pump 102 and/or the swing motor 130. The leakage due to the gravity pressure results in machine drift without operator input to the swing system. The drifting of the swing system in a typical machine may cause difficulties for an operator trying to load a truck as the operator must constantly adjust the swing command to offset for the drift of the swing system. This difficulty provides for operator fatigue and slows down production by the machine 100 as it introduces additional complexity to the use of the machine 100.

In a conventional "closed loop" system any additional torque induced for instance by the attachment load of the excavator standing or driving on the incline 202 is compensated by a counter torque induced by the pump 102 and the swing motor 130 until eventually the swing brake system is applied. The swing brake typically applies automatically after a certain time of non-usage of the swing operation, typically after 3 to 7 seconds. This time delay may not elapse during use of the system, and therefore the operator may, in a conventional system, have to manually adjust for the drift because the swing brake is not applied.

The hydraulic system of the swing motor 130 and the pump 102 has internal leakages. In case the excavator is in a non-horizontal position (for instance when standing or driving on the incline 202) these leakages (and the gravitation force) may eventually cause the upper portion of the machine 100 to change its position (to "drift") in a rotational manner relative to the undercarriage of the machine 100 with time when the swing brake is not applied. The speed of the movement depends on the amount of internal leakage. However, in some working conditions, the operator needs to keep the position of the upper portion relative to the undercarriage without being disturbed by such an unwanted drift movement. Accordingly, the swing system 120 described herein provides for preventing the drift motion without requiring the operator to provide a counteracting input.

Returning to FIG. 1, the swing system 120 of the present description provides for the blocking valve 126 and relief valve 128 to solve the aforementioned problem and provide for the operator to avoid adjusting for the gravity drift of the machine. The blocking valve 126, as described herein prevents the leakage from causing swing drift at the machine 100 and thereby provides for stable placement of the machine without requiring the swing parking brake to be engaged or requiring operator inputs to adjust for leakage at the pump 102 and the swing motor 130.

The swing system 120 implements the blocking valve 126 with the control valve(s) 104 to negate the effects of drift and provide for anti-drift control of the swing of the machine 100. The blocking valve 126 is closed when the swing command from the operator input is in neutral and the swing speed is below a threshold rate of rotation, such as down to and/or below 1.5 degrees/second, though other thresholds are contemplated, such as below 0.5 RPM, below 0.1 RPM, below 1 RPM, or other such ranges that are indicative of the machine 100 having a "slow" or low swing rotation rate. When the blocking valve 126 is closed, the leakage from the pump 102 is isolated from the remainder of the swing system 120 and therefore the swing drift is significantly reduced or eliminated.

The blocking valve 126 includes a solenoid valve added in the fluid path of the swing system (and in the instance of multiple fluid paths e.g., a first hydraulic path to the swing motor 130 from the pump 102 and a second hydraulic path to the swing motor 130 from the pump 102, multiple blocking valves are implemented with one in each path or associated with each of the control valve(s) 104). The solenoid valve switches off a pilot supply of fluid to the swing system and causes the pilot supply of fluid to be shut off when closed.

Shutting off the pilot supply of fluid may cause pressure buildup at the swing motor 130. To protect the swing motor 130, a relief valve 128 may be added with the blocking valve 126. When the pressure at the swing motor 130 reaches the relief setting due to an external load (e.g., gravity load causing drift), the blocking valve may open and a crossover relief valve connected between input and output sides of the swing motor 130 will limit the loop pressure at the swing motor 130.

During operation of the machine 100, when the operator input is in neutral, the blocking valve 126 is closed (e.g., in response to a signal from a controller of the machine 100). In some examples, the blocking valve 126 is shut in response to the rotation rate of the swing system being below a threshold rate in addition to the swing system input being in a neutral position. When the operator input changes and is no longer in neutral (e.g., to drive the swing system in rotation in either direction, the blocking valve 126 is opened until the conditions are met for closing the blocking valve 126.

The blocking valve 126 includes a solenoid or other active component such as another electrical, air, fluid, or electro-mechanical manner of switching the blocking valve between a first position and a second position. When the controller detects or determines that the conditions are satisfied (e.g., input is neutral and/or the swing rate of the machine 100 is below a threshold), then the controller causes the active component to engage and block the fluid flow using the blocking valve 126.

Figure 3:
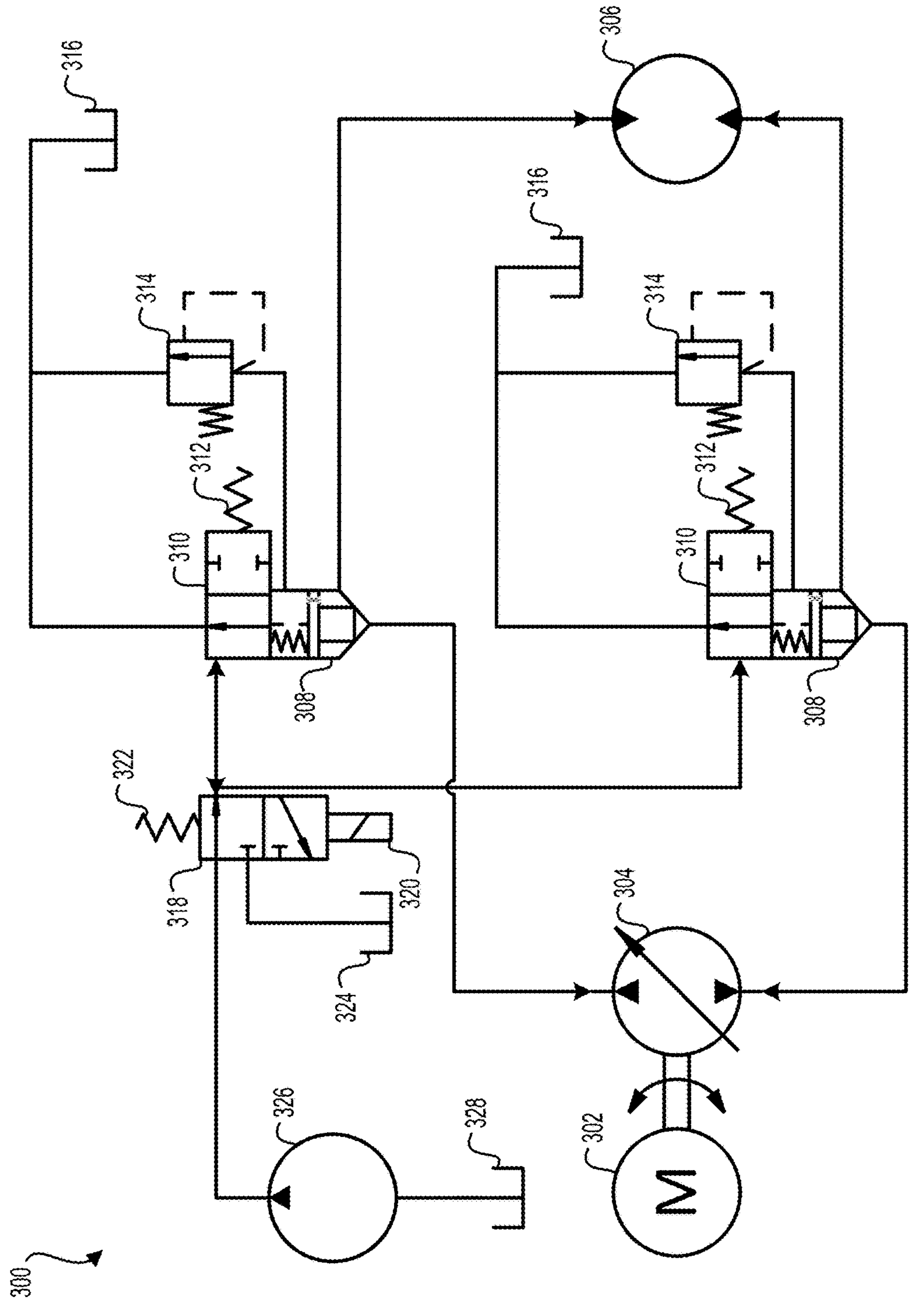
FIG. 3 depicts a schematic of a hydraulic swing system for the machine of FIG. 1, according to at least one example.

Turning now to the details of the hydraulic swing system, FIG. 3 depicts a schematic of a hydraulic swing system 300 for the machine 100 of FIG. 1, according to at least one example. Though the hydraulic swing system is depicted with a single engine, single pump, and single motor, the swing system of the machine 100 may include two or more of the engine, pump, and motor, and corresponding additional components as shown and described herein.

The hydraulic swing system 300 includes an engine 302 or other motive system that provides a rotational input to a pump 304. The engine 302 provides for rotation of the pump 304 to pump a hydraulic fluid to a swing motor 306. The swing motor 306 provides force at the swing system for rotation of the upper portion of the machine 100 relative to the undercarriage of the machine 100. Accordingly, the pump 304 is fluidly connected to the swing motor 306 through hydraulic fluid lines providing at least a first hydraulic path and a second hydraulic path. The first hydraulic path from the pump 304 to the swing motor 306 in a first direction and the second hydraulic path from the pump 304 to the swing motor 306 in a second direction opposite the first direction.

The hydraulic swing system 300 shows a closed loop system wherein the pump 304 and the swing motor 306 are in communication through the first hydraulic path and the second hydraulic path. The swing motor 306 may include a fixed displacement piston motor, variable displacement motor, or other such motor as known and used in other hydraulic systems. The pump 304 may include a variable displacement piston pump or other such suitable pump, the displacement of which is controlled by a control input from an operator. The hydraulic fluid is driven by the pump 304 to control valves and on to the motor 306 in a first direction or a second direction along the first hydraulic path and the second hydraulic path. The swing motor 306 rotates in a first direction or second direction in response to the hydraulic fluid flow. In examples, a swash plate of the swing motor 306 may be used to control a direction of rotation of the swing motor 306.

The control valves include a cartridge valve 308 having a restrictor valve implemented therein. The control valve further includes a valve 310 actuated by a return 312 such as a spring. The valve 310 is movable between a first position and a second position. The control valves are disposed within the first hydraulic path and the second hydraulic path between the pump 304 and the motor 306. The control valves, and in particular the cartridge valve 308 direct the hydraulic fluid to the motor 306 along the first hydraulic path or the second hydraulic path. With the hydraulic swing system 300 being a closed loop system, for the swing motor 306 to rotate, the control valves work in concert to provide the hydraulic fluid to the swing motor 306 along the first hydraulic path and provide for hydraulic fluid to flow away from the swing motor 306 along the second hydraulic path. For the swing motor 306 to rotate in a second, opposite direction, the flow controlled by the cartridge valves 308 may be reversed and/or controlled based on a swash plate of the swing motor 306. The cartridge valves 308 may be controlled by a controller of the machine 100 in response to the operator input, for example based on the input on a manipulator stick by the operator. The cartridge valve 308 includes a restrictor valve for allowing communication of pressure across the cartridge valve 308.

The hydraulic swing system 300 includes a relief valve 314 fluidly connected with the control valves. The relief valve 314 is connected at an output side with a reservoir 316. The relief valve 314 are fluidly connected with the cartridge valves 308 of the control valves and provide for relief of pressure in the event of pressure buildup at the control valves. The maximum working pressure of the swing system is limited by the relief valves 314. Shutting off a pilot supply of fluid may cause pressure buildup at the swing motor 306. To protect the swing motor 306, a relief valve 314 may be added to the hydraulic swing system 300. When the pressure at the swing motor 306 and/or the control valves reaches the relief setting due to an external load (e.g., gravity load causing drift), the relief valve may open to allow the pressure to reduce to the working limit.

The hydraulic swing system 300 includes a blocking valve 318 for providing blocking in the system as described herein. The blocking valve 318 is actuated by an active component such as a solenoid as well as a return 322 between a first position and a second position. The blocking valve 318 provides for fluid to selectively flow into the hydraulic system from an impeller pump 326 that draws fluid from a reservoir 328 or for blocking the impeller pump. The blocking valve may provide for shutting off a conduit between the control valve and a pilot source of the hydraulic fluid.

The blocking valve 318, as described herein prevents the leakage from causing swing drift at the machine 100 and thereby provides for stable placement of the machine 100 without requiring the swing parking brake to be engaged or requiring operator inputs to adjust for leakage at the pump 304 and the swing motor 360.

The hydraulic swing system 300 implements the blocking valve 318 with the control valve(s) to negate the effects of drift and provide for anti-drift control of the swing of the machine 100. The blocking valve 318 is closed when the swing command from the operator input is in neutral and the swing speed is below a threshold rate of rotation, such as down to and/or below 1.5 degrees/second, though other thresholds are contemplated, such as below 0.5 RPM, below 0.1 RPM, below 1 RPM, or other such ranges that are indicative of the machine 100 having a "slow" or low swing rotation rate. When the blocking valve 318 is closed, the leakage from the pump 304 and/or swing motor 306 is isolated from the remainder of the hydraulic swing system 300 and therefore the swing drift is significantly reduced or eliminated.

The blocking valve 318 includes a solenoid valve added in the fluid path of the swing system (and in the instance of multiple fluid paths e.g., a first hydraulic path to the swing motor 306 from the pump 304 and a second hydraulic path to the swing motor 306 from the pump 304, multiple blocking valves are implemented with one in each path or associated with each of the control valve(s)). The blocking valve 318 switches off a pilot supply of fluid to the swing system and causes the pilot supply of fluid to be shut off when closed. The blocking valve 318 uses the solenoid 320 and the return 322 (e.g., a spring or other biasing element) to position the blocking valve 318 in the positions described herein.

Figure 4:
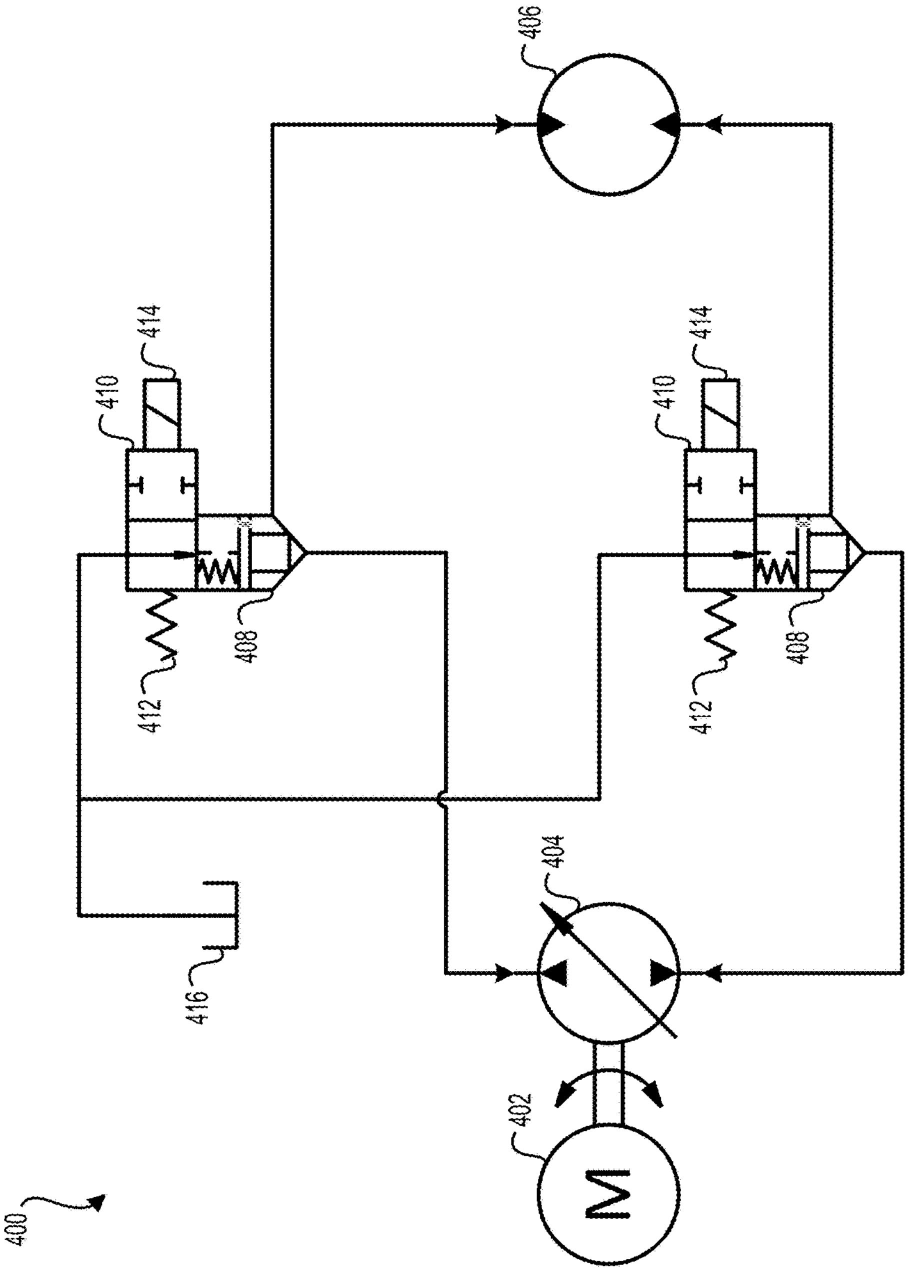
FIG. 4 depicts a schematic of a hydraulic swing system for the machine of FIG. 1, according to at least one example.

FIG. 4 depicts a schematic of a hydraulic swing system 400 for the machine 100 of FIG. 1, according to at least one example. The hydraulic swing system 400 may be implemented on the machine 100 or another similar machine. The hydraulic swing system 400 may be an example of the hydraulic swing system 300 of FIG. 3. The hydraulic swing system 300 and the hydraulic swing system 400 may be implemented to prevent drift in the swing system of the machine 100.

The hydraulic swing system 400 includes an engine 402 or other motive system that provides a rotational input to a pump 404. The engine 402 provides for rotation of the pump 404 to pump a hydraulic fluid to a swing motor 406. The swing motor 406 provides force at the swing system for rotation of the upper portion of the machine 100 relative to the undercarriage of the machine 100. Accordingly, the pump 404 is fluidly connected to the swing motor 406 through hydraulic fluid lines providing at least a first hydraulic path and a second hydraulic path. The first hydraulic path from the pump 404 to the swing motor 406 in a first direction and the second hydraulic path from the pump 404 to the swing motor 406 in a second direction opposite the first direction.

The hydraulic swing system 400 shows a closed loop system wherein the pump 404 and the swing motor 406 are in communication through the first hydraulic path and the second hydraulic path. The swing motor 406 may include a fixed displacement piston motor, variable displacement motor, or other such motor as known and used in other hydraulic systems. The pump 404 may include a variable displacement piston pump or other such suitable pump, the displacement of which is controlled by a control input from an operator. The hydraulic fluid is driven by the pump 404 to control valves and on to the motor 406 in a first direction or a second direction along the first hydraulic path and the second hydraulic path with the direction.

The control valves include a cartridge valve 408 having a restrictor valve implemented therein. The control valve further includes a valve 410 actuated by a return 412 such as a spring or other biasing element. The valve 410 is movable between a first position and a second position. The control valves are disposed within the first hydraulic path and the second hydraulic path between the pump 404 and the motor 406. The control valves, and in particular the cartridge valve 408 direct the hydraulic fluid to the motor 406 along the first hydraulic path or the second hydraulic path. With the hydraulic swing system 400 being a closed loop system, for the swing motor 406 to rotate, the control valves work in concert to provide the hydraulic fluid to the swing motor 406 along the first hydraulic path and provide for hydraulic fluid to flow away from the swing motor 406 along the second hydraulic path. For the swing motor 406 to rotate in a second, opposite direction, the flow controlled by the cartridge valves 408 may be reversed. The cartridge valves 408 may be controlled by a controller of the machine 100 in response to the operator input, for example based on the direction of input on a manipulator stick by the operator. The cartridge valve 408 also includes a restrictor valve.

In the hydraulic swing system 400 of FIG. 4, the blocking valve described herein is implemented with the control valve. The control valve includes the valve 410 actuated with a return 412 but the valve 410 is also actuated by an action component 414. The action component 414 includes a solenoid for moving the valve between the first position and the second position. The action component and the return 412 act to move the valve in opposite directions. Therefore, when the hydraulic swing system 400 is not in motion (e.g., in neutral and/or rotating at a rate below the threshold rate), the valve 410 is actuated by the action component 414 to block fluid flow and prevent the swing motor 406 from drifting as the hydraulic fluid is prevented from flowing past the control valves.

The control valves may include built-in relief valves that enable pressure relief to a reservoir 416 from the control valves in the event that the pressure exceeds the working pressure of the system.

Figure 5:
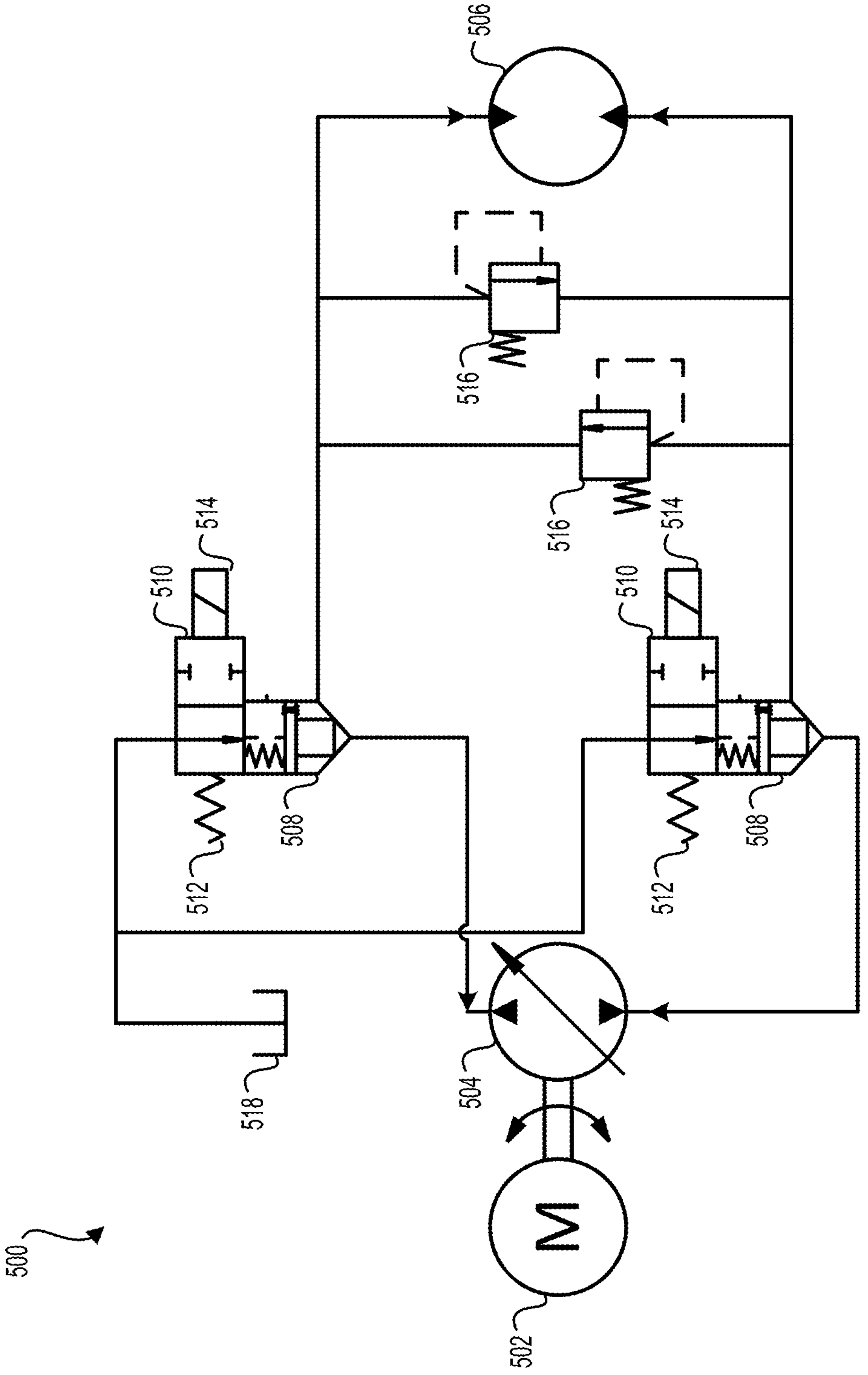
FIG. 5 depicts a schematic of a hydraulic swing system for the machine of FIG. 1, according to at least one example.

FIG. 5 depicts a schematic of a hydraulic swing system 500 for the machine 100 of FIG. 1, according to at least one example. The hydraulic swing system 500 may be similar to the hydraulic swing system 400 of FIG. 4 but may additionally implement a crossover relief valves.

The hydraulic swing system 500 includes an engine 502 or other motive system that provides a rotational input to a pump 504. The engine 502 provides for rotation of the pump 504 to pump a hydraulic fluid to a swing motor 506. The swing motor 506 provides force at the swing system for rotation of the upper portion of the machine 100 relative to the undercarriage of the machine 100. Accordingly, the pump 504 is fluidly connected to the swing motor 506 through hydraulic fluid lines providing at least a first hydraulic path and a second hydraulic path. The first hydraulic path from the pump 504 to the swing motor 506 in a first direction and the second hydraulic path from the pump 504 to the swing motor 506 in a second direction opposite the first direction.

The hydraulic swing system 500 shows a closed loop system wherein the pump 504 and the swing motor 506 are in communication through the first hydraulic path and the second hydraulic path. The swing motor 506 may include a fixed displacement piston motor, variable displacement motor, or other such motor as known and used in other hydraulic systems. The pump 504 may include a variable displacement piston pump or other such suitable pump, the displacement of which is controlled by a control input from an operator. The hydraulic fluid is driven by the pump 504 to control valves and on to the motor 506 in a first direction or a second direction along the first hydraulic path and the second hydraulic path with the direction.

The control valves include a cartridge valve 508 having a restrictor valve implemented therein. The control valve further includes a valve 510 actuated by a return 512 such as a spring or other biasing element. The valve 510 is movable between a first position and a second position. The control valves are disposed within the first hydraulic path and the second hydraulic path between the pump 504 and the motor 506. The control valves, and in particular the cartridge valve 508 direct the hydraulic fluid to the motor 506 along the first hydraulic path or the second hydraulic path. With the hydraulic swing system 500 being a closed loop system, for the swing motor 506 to rotate in a first direction the control valves work in concert to provide the hydraulic fluid to the swing motor 506 along the first hydraulic path and provide for hydraulic fluid to flow away from the swing motor 506 along the second hydraulic path. For the swing motor 506 to rotate in a second, opposite direction, the flow controlled by the cartridge valves 508 may be reversed. The cartridge valves 508 may be controlled by a controller of the machine 100 in response to the operator input, for example based on the direction of input on a manipulator stick by the operator. The cartridge valve 508 includes a restrictor valve.

In the hydraulic swing system 500 of FIG. 5, the blocking valve described herein is implemented with the control valve. The control valve includes the valve 510 actuated with a return 512 but the valve 510 is also actuated by an action component 514. The action component 514 includes a solenoid for moving the valve between the first position and the second position. The action component and the return 512 act to move the valve in opposite directions. Therefore, when the hydraulic swing system 500 is not in motion (e.g., in neutral and/or rotating at a rate below the threshold rate), the valve 510 is actuated by the action component 514 to block fluid flow and prevent the swing motor 506 from drifting as the hydraulic fluid is prevented from flowing past the control valves.

The control valves may include built-in relief valves that enable pressure relief to a reservoir 518 from the control valves in the event that the pressure exceeds the working pressure of the system.

The hydraulic swing system 500 includes crossover relief valves 516 that provide for preventing pressure buildup above a threshold level on either side of the swing motor 506. The crossover relief valves 516 connect between the first hydraulic path and the second hydraulic path, providing a connection between the opposite sides of the swing motor 506. The crossover relief valves 516 provide for pressure relief and equalization of pressure across the swing motor 506 without the system allowing drift across the swing system. The crossover relief valves 516 enable overflow of hydraulic fluid when the pressure on either side of the swing motor 506 reaches or exceeds a threshold value.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features, it is to be understood that the subject matter defined in the appended claims is not necessarily limited to the specific features described. Rather, the specific features are disclosed as illustrative forms of implementing the claims.

INDUSTRIAL APPLICABILITY

The present disclosure provides systems and methods for reducing and preventing drift of hydraulic swing system for a machine. Such a drift may occur especially when the construction machinery or vehicle is positioned or moving on a slope and has a load attached. The present system reduces the swing drift of a construction machinery or vehicle, particularly of an excavator of crane, equipped with a closed loop swing system, by providing and applying a blocking valve when the upper portion of the machine should be standing still (i.e. when it should keep its position and orientation relative to the under-carriage on which it is mounted) as determined based on operator input. For example, when the operator is not providing an input, the upper portion of the machine is enabled to remain stationary and thereby counteract machine drift typical in conventional machines. Further, the blocking valve and systems described herein can be easily added to a known swing system.

The system described herein provide the operator with higher comfort by preventing machine drift in the swing system when the upper portion is supposed to be standing still (e.g., not rotating relative to the undercarriage or chassis on which it is mounted), thus considerably reducing or even avoiding the risk of an unwanted drift movement due to internal leakages in the hydraulic system of the swing motor and swing pump. Additionally, as the swing drift is significantly reduced (or even avoided) without human intervention, the machine is improved, in this case, by reducing (or avoiding) the swing drift.

In a conventional "closed loop" system any additional torque induced for instance by the attachment load of the excavator standing or driving on an incline is compensated by a counter torque induced by the pump and the swing motor until eventually the swing brake system n is applied. The swing brake typically applies automatically after a certain time of non-usage of the swing operation, typically after 3 to 7 seconds. This time delay may not elapse during use of the system, and therefore the operator may, in a conventional system, have to manually adjust for the drift because the swing brake is not applied. During operation of the machine, as described herein, the swing parking brake is not engaged, as the machine may need to rotate and engagement/disengagement of the swing parking brake may take time that causes delay in operation of the machine and therefore delays production.

Because the hydraulic system of the swing motor and the pump has internal leakages. In case the excavator is in a non-horizontal position (for instance when standing or driving on an incline) these leakages (and the gravitation force) may eventually cause the upper portion of the machine to change its position (to "drift") in a rotational manner relative to the undercarriage of the machine with time when the swing brake is not applied. The speed of the movement depends on the amount of internal leakage. However, in some working conditions, the operator needs to keep the position of the upper portion relative to the undercarriage without being disturbed by such an unwanted drift movement. Accordingly, the swing system described herein provides for preventing the drift motion without requiring the operator to provide a counteracting input.

The swing system of the present description provides for a blocking valve and a relief valve to solve the aforementioned problem and provide for the operator to avoid adjusting for the gravity drift of the machine. The blocking valve, as described herein prevents the leakage from causing swing drift at the machine and thereby provides for stable placement of the machine without requiring the swing parking brake to be engaged or requiring operator inputs to adjust for leakage at the pump and the swing motor.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A hydraulic swing system for a hydraulic machine, comprising:
a hydraulic pump driven by a motive device;
a hydraulic motor configured to drive rotation of the hydraulic swing system; and
a first swing control valve assembly in a first hydraulic path between the hydraulic pump and the hydraulic motor, comprising:
a first control valve for controlling hydraulic fluid flow to the hydraulic motor; and
a first blocking valve connected to the first control valve, having a first position and a second position driven by a solenoid and a return and configured to stop rotation of the hydraulic motor, wherein the solenoid is configured to activate in response to a rotation rate of the hydraulic swing system being below a threshold rotation rate.

2. The hydraulic swing system of claim 1, further comprising:
a second swing control valve assembly in a second hydraulic path between the hydraulic pump and the hydraulic motor, comprising:
a second control valve for controlling hydraulic fluid flow to the hydraulic motor; and
a second blocking valve connected to the second control valve, having a first position and a second position driven by a solenoid and a return and configured to stop rotation of the hydraulic motor.

3. The hydraulic swing system of claim 1, wherein:
in the first position, a conduit is opened between a fluid reservoir and the first hydraulic path; and
in the second position, the conduit between the fluid reservoir and the first hydraulic path is blocked.

4. The hydraulic swing system of claim 1, further comprising a controller configured to receive inputs from an operator of the hydraulic machine and control operation of the hydraulic pump and first control valve.

5. The hydraulic swing system of claim 4, wherein the controller is configured to activate the solenoid in response to a neutral indication from a user input.

6. The hydraulic swing system of claim 4, wherein activating the solenoid causes the first blocking valve to move to the second position.

7. A system for controlling swing on a machine comprising:
a hydraulic pump driven by a motive device;
a hydraulic motor configured to drive rotation a first portion of the machine relative to a second portion of the machine;
a first swing control valve assembly in a first hydraulic path between the hydraulic pump and the hydraulic motor, comprising:
a first control valve for controlling hydraulic fluid flow to the hydraulic motor; and
a first blocking valve connected to the first control valve, having a first position and a second position, and driven from the first position to the second position by an active component and configured to stop rotation of the hydraulic motor, wherein the active component is configured to activate in response to a signal indicating that a state of an input control for the machine is neutral and a rotational speed of the first position of the machine relative to the second portion is below a threshold.

8. The system of claim 7, wherein the active component comprises a solenoid.

9. The system of claim 7, wherein the first control valve comprises a cartridge valve coupled with a valve for selective flow of hydraulic fluid based on a control signal of the machine.

10. The system of claim 7, further comprising a relief valve fluidly coupled to the first control valve and configured to provide pressure relief to the first hydraulic path.

11. The system of claim 7, further comprising:
a second swing control valve assembly in a second hydraulic path between the hydraulic pump and the hydraulic motor, comprising:
a second control valve for controlling hydraulic fluid flow to the hydraulic motor; and
a second blocking valve connected to the second control valve, having a first position and a second position driven by a solenoid and a return.

12. The system of claim 11, further comprising:
a first relief valve fluidly coupled with the first control valve; and
a second relief valve fluidly coupled with the second control valve.

13. The system of claim 12, wherein the first relief valve and the second relief valve are configured to provide crossover relief between the first hydraulic path and the second hydraulic path.

14. A hydraulically-operated machine comprising:
a machine base;
a machine upper portion; and
a swing system connecting the machine upper portion with the machine base and configured to enable rotation of the machine upper portion relative to the machine base, wherein the swing system comprises:
a hydraulic pump driven by a motive device;
a hydraulic motor configured to drive rotation a first portion of the hydraulically-operated machine relative to a second portion of the hydraulically-operated machine;
a first swing control valve assembly in a first hydraulic path between the hydraulic pump and the hydraulic motor, comprising:
a first control valve for controlling hydraulic fluid flow to the hydraulic motor; and
a first blocking valve connected to the first control valve, having a first position and a second position, and driven from the first position to the second position by an active component and configured to stop rotation of the hydraulic motor;
a first crossover relief valve connecting the first hydraulic path with a second hydraulic path between the hydraulic pump and the hydraulic motor, the first crossover relief valve having a first configuration operable to enable fluid flow from the first hydraulic path to the second hydraulic path in response to a first pressure differential between the first hydraulic path and the second hydraulic path exceeding a first threshold; and
a second crossover relief valve connecting the first hydraulic path with the second hydraulic path, the second crossover relief valve having a second configuration operable to enable fluid flow from the second hydraulic path to the first hydraulic path in response to a second pressure differential between the second hydraulic path and the first hydraulic path exceeding a second threshold; and a controller, the controller comprising a processor and non-transitory computer readable medium having instructions stored thereon that, when executed, cause the processor to perform operations including:

determining a state of an input control to the swing system;

determining a rotational speed of the swing system; and in response to determining the state of the input control to be neutral and the rotational speed being below a threshold, activating the active component of the first blocking valve.

15. The hydraulically-operated machine of claim 14, wherein the active component comprises a solenoid.

16. The hydraulically-operated machine of claim 14, wherein:

in the first position, a conduit is opened between a fluid reservoir and the first hydraulic path; and in the second position, the conduit between the fluid reservoir and the first hydraulic path is blocked.

17. The hydraulically-operated machine of claim 14, further comprising:

a second swing control valve assembly in the second hydraulic path between the hydraulic pump and the hydraulic motor, comprising:

a second control valve for controlling hydraulic fluid flow to the hydraulic motor; and a second blocking valve connected to the second control valve, having a first position and a second position driven by a solenoid and a return.

18. The hydraulically-operated machine of claim 17, further comprising:

a first relief valve fluidly coupled with the first control valve; and a second relief valve fluidly coupled with the second control valve.

* * * * *